United States Patent

Martinez Parra

[11] 4,396,843
[45] Aug. 2, 1983

[54] SYSTEM FOR THE GENERATION OF ELECTRICAL ENERGY FROM WIND ENERGY

[76] Inventor: José Martinez Parra, Calle Salitre 33-1°, Edificio Juan XXIII, Cartagena, Murcia, Spain

[21] Appl. No.: 280,080

[22] Filed: Jul. 2, 1981

[30] Foreign Application Priority Data

Jul. 17, 1980 [ES] Spain .................................. 493.471

[51] Int. Cl.³ ............................................. F03D 3/04
[52] U.S. Cl. ...................................... 290/55; 415/2 R
[58] Field of Search ................... 290/44, 55, 2 R, 3 R, 290/4 R; 415/2–4 R

[56] References Cited

U.S. PATENT DOCUMENTS 2,510,501  6/1950  Johnson .................................. 415/4
4,031,173  6/1977  Rogers .................................. 290/55

Primary Examiner—J. V. Truhe
Assistant Examiner—Shelley Wade
Attorney, Agent, or Firm—Kenyon & Kenyon

[57] ABSTRACT

The subject-matter of the present invention is a system for the generation of electrical energy from wind energy consisting of a domed building (3) and a large dimension impeller (5) mounted thereupon. The shape of the impeller (5) is adapted to the curvature of the domed building. It is supported on the surface of the domed building via rollers (71) and rails (16). In the region of the rollers (71) and rails (16) members for braking and holding the vanes are provided. The rotary movement of the impeller is transmitted via a central axis (6) to a machine park (12) to (15) housed in the interior of the domed building (3) so as to generate electrical energy. The system according to the invention is distinguished by its excellent stability despite its large dimensions; cf. FIG. 2.

8 Claims, 12 Drawing Figures

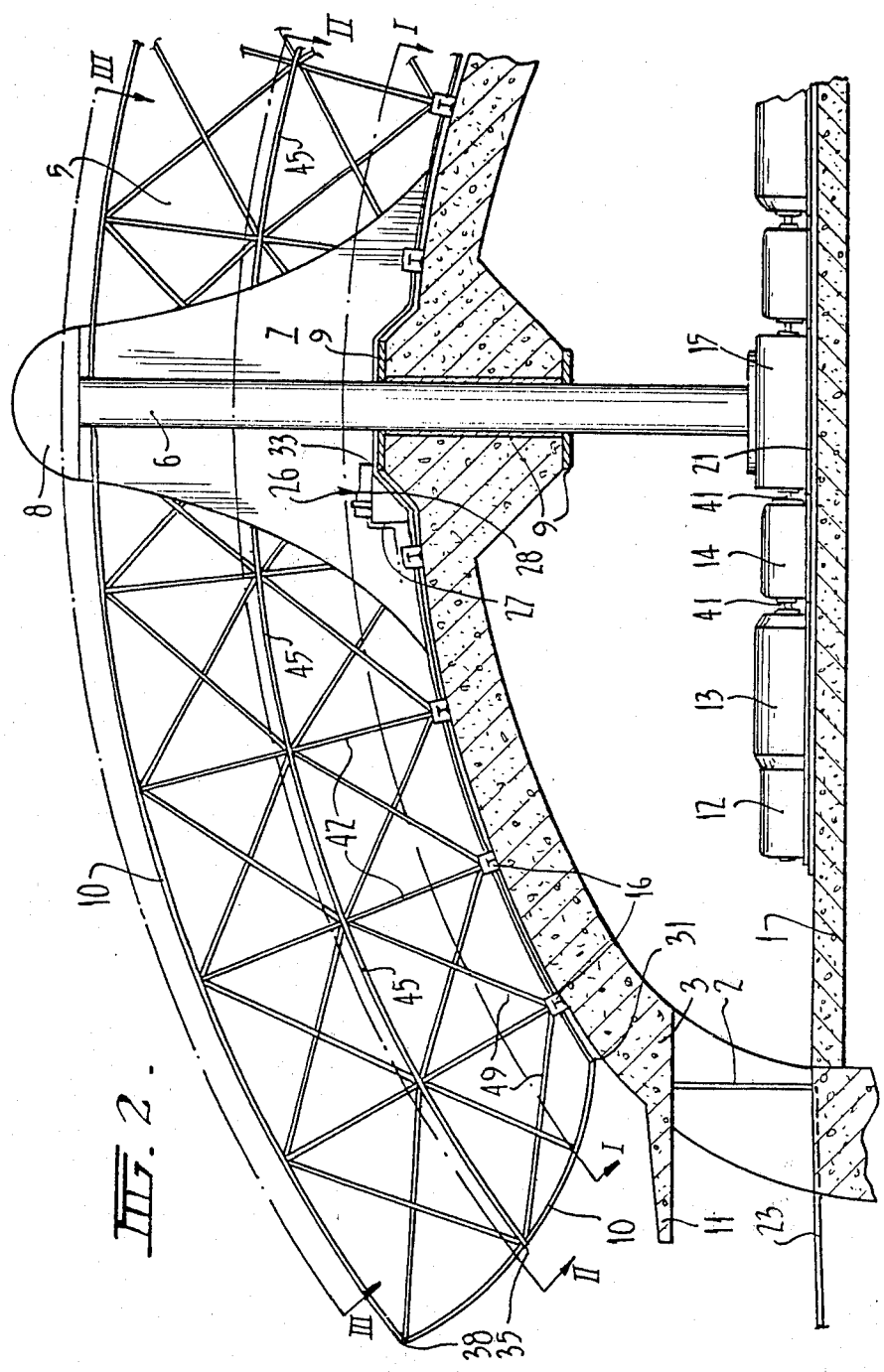

SYSTEM FOR THE GENERATION OF ELECTRICAL ENERGY FROM WIND ENERGY

BACKGROUND OF THE INVENTION

The subject-matter of the present invention is a system for the generation of electrical energy from wind energy.

The conversion of the kinetic energy of a rotating impeller or rotor into electrical energy by means of a generator is already known. The principle of rotating the impeller or rotor by means of wind power is also known. If, however, generation of electrical energy on a greater scale is intended, installations or large dimensions are necessary which can capture a sufficient amount of wind energy. However, installations having large impellers give rise to considerable problems as regards the stability of the assembly, particularly owing to the frequently irregular wind force. It is often not possible to ensure an approximately regular rotary movement when the wind force varies. Moreover, stronger gusts may tear the large vanes from their mountings or distort them.

It is an object of the invention to provide a system which permits the generation of a large quantity of electrical energy from wind energy.

It is another object of the invention to provide a system for the generation of electrical energy from wind energy which has large but stable dimensions.

It is a further object of the invention to provide a system for the generation of electrical energy from wind energy ensuring a relatively constant rotary movement of the impeller even when the wind is irregular.

It is a further object of the invention to provide a system for the generation of electrical energy from wind energy which is safe from distortion or tearing of the vanes from their mountings.

These and other objects and advantages of the invention will be evident from the following description of the invention.

SUMMARY OF THE INVENTION

The subject-matter of the present invention is a system for the generation of electrical energy from wind energy which is characterized by a domed building upon which an impeller is mounted, whose vertical axis penetrates the domed building at its highest point and transmits the motion of the impeller to an installation which converts the kinetic energy of the impeller into electrical energy, at least the lower edge of the impeller vanes being adapted to the curved shape of the domed building and the vanes being supported on rails and held by them, said rails being anchored to the assembly of the domed building in such a way that they describe concentric circles around its highest point.

Thanks to the stable construction and the bracing and anchorage of the impeller vanes described below the system of the invention enables the construction of a large installation and thus generation of a considerable amount of electrical energy by utilizing a great amount of wind energy. Thanks to the inventive design of the impeller and its large diameter and the considerable inertia due to its weight a constant rotary movement is achieved which is largely independent of brief changes in the wind force and roughly determined by the average wind force. The frictional losses of the inventive system are kept at a relatively low level thanks to the design of the impeller and the way it is supported on the domed building, so that a high degree of efficiency can be achieved in the conversion of the kinetic energy of the impeller into electrical energy.

BRIEF DESCRIPTION OF THE DRAWINGS

The accompanying figures show an embodiment of the system according to the invention for the generation of electrical energy from wind energy:

FIG. 2: an enlarged part of FIG. 1 with an embodiment of a vane of the impeller;

FIG. 9 is a section of the system showing a plane parallel to the surface of the vane.

FIG. 10 is a section of the system along the line A—A of FIG. 9 looking in the direction of the surface of the domed building.

FIG. 11 is a section of the system along the line B—B of FIG. 9 looking in the direction of the arrow.

FIG. 12 is a section of the system along the line C—C of FIG. 9 looking in the same direction as FIG. 10.

DETAILED DESCRIPTION OF THE INVENTION

Figure 1:
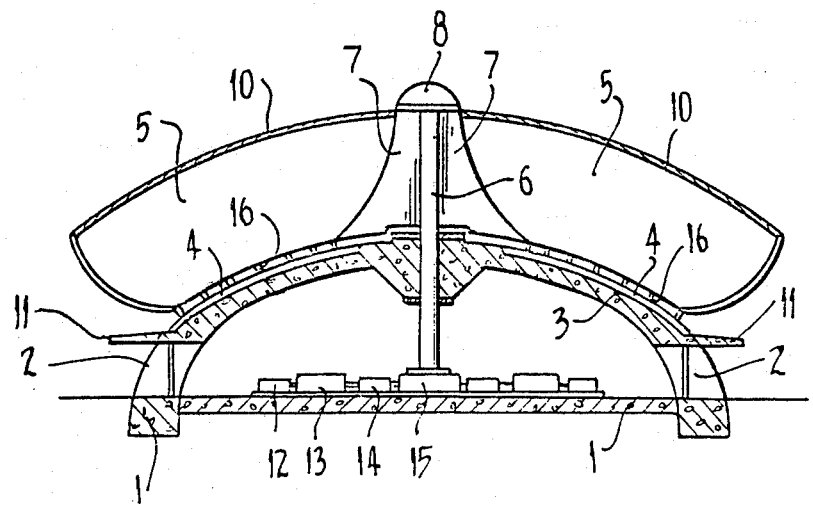
FIG. 1: a vertical section of the system.

In order to achieve good results the system of the invention is installed in geographically suitable locations, i.e. where the wind is frequently relatively strong; thus a great amount of energy can be utilized. The installations of the invention are located in and on a solid building, which forms an essential part of the system and has a circular plan view, the upper part thereof having the form of a large dome.

The domed building consists of armored concrete with reinforcements arranged in the form of ribs: This also applies to the foundations and the bases and pedestals of the complete machine park and the generators to be installed. As regards the domed building it has to be taken into account that its outer component parts must—with a sufficient safety factor—bear its own weight and the pressures to which the building is subjected owing to its mass and the motion of the large impeller, which is installed at its upper part.

Preferably the system of the invention is surrounded by an extensive flat area which, apart from providing for the necessary open spaces for accesses and room for the storage of heavy material, is mainly intended to prevent obstacles from getting into the path of the wind so as to facilitate its effect on the vanes of the impeller.

The transformer park connected to the system of the invention is installed at another deeper level for the above-mentioned reason.

The construction of the domed building and in particular that of the impeller mounted thereon is of particular importance for the system of the invention. The vanes or shovels of the impeller are curved both in longitudinal and in transverse direction. In order to achieve maximum stability the whole circumference of the vanes is reinforced by profiles. Further profiles are also located across the surface of the vanes. The impeller vanes consist of a material of suitable stability, for example a metal like aluminum. This applies both to the vane blades and the reinforcement profiles.

In order to increase the stability of the system the impeller vanes are connected and braced with each other by cables, preferably steel cables. These cables are located between the upper edges, the central area and the lower edges of the impeller vanes at a constant height. In a preferred embodiment the bracing is further reinforced by additional cables between the upper edge of a vane and the central area of the adjacent vanes as well as between the central area of a vane and the lower edge of the adjacent vanes, or vice versa.

An essential feature of the system according to the invention is the mutual adaption of the shape of the domed building and the impeller. The diameter of the impeller is preferably at least as great as that of the domed building. At least the shape of the lower edges of the impeller vanes is such that it is adapted to the curvature of the roofing of the dome. This provides for the possibility of supporting the impeller vanes on the domed building in a favorable manner. The space between the lower edge of the impeller vanes and the surface of the domed building is kept a small as possible so that the wind only finds as small a passage as possible. Preferably the upper edge of the impeller vane too is adapted to the curvature of the domed building, thus giving the whole assembly a curved and domed look and achieving a particularly favorable aerodynamic behavior of the system.

Another reason for shaping the vanes of the large dimension impeller in the manner according to the invention is to provide systems in which the domed building is capable of supporting the considerable weight of the impeller vanes and where the vanes can maintain their position for example when wind force changes suddenly. Thus the vanes are prevented from lifting off and destroying the system.

Installed and anchored on the surface of the domed building are rails in the forms of rings which are concentric towards the center of the building and on which the impeller vanes are supported. The rails have the form of a double T-support. Corresponding installations in the lower edges of the impeller vanes encompass the upper T of the rails, while a wheel with a rubber surface runs on the rails. This enables the installation to operate largely oscillation-free, thus contributing considerably to the stability of the system. The installations located at the lower edge of the vane from lifting off or veering. These running and holding members are additionally equipped with brake means to be operated mechanically or hydraulically by the aid of which the rotary movement of the impeller can be stopped. An embodiment of the inventive running, brake and holding members of the impeller vanes is described below in conjunction with the drawings.

Several concentrically arranged rails are installed on the surface of the domed building. Their number and exact distance from each other is not particularly critical. However, to give the impeller sufficient stability a distance of approximately 5 m between the individual rails is preferred.

The fact that the impeller vanes run on the rails which are anchored at the domed building by means of wheels or rollers enables a largely friction-free operation of the impeller. The relatively great mass and the corresponding inertia of the impeller keep it in motion for some time even when the wind drops temporarily.

The rotary movement of the impeller is transmitted to a gear by its central axis, which penetrates the building at its highest point. This gear forms part of the machine park for the conversion of kinetic energy into electrical energy. This machine park is housed in the interior of the domed building. It comprises, apart from the main gear, installations for the automatic control of the number of revolutions of the impeller and/or the subsequent generators for the generation of electrical energy, so as to achieve optimum operating conditions in view of the respective wind force. If the generators are direct-current generators they may be followed by electromechanic or electronic alternators such as transformers of direct or alternating current (direct current motor followed by an alternator) or inverted rectifiers.

Therefore an essential characteristic of the inventive system is the construction of the domed building and the impeller. Thanks to its relatively low height and its solidity a very large dimension impeller can be constructed according to the invention which can utilize the wind independent of its direction. The motion of the impeller generates a considerable amount of kinetic energy which can be converted economically into an amount of electrical energy which is also considerable.

The system according to the invention is illustrated by means of the embodiment shown in the drawing.

FIG. 1 represents a vertical section of the inventive system and shows its essential elements. In FIG. 1 number 1 designates the foundations of the building, 2 the access doors to the building and 3 designates the upper part of the domed building consisting of armored concrete and having the necessary stability for the span to be bridged and the weight to be borne. 3 represents a longitudinal section of a supporting rib. 4 designates the covering ceiling of the domed building which, like the supporting ribs, consists of armored concrete. The shovels or vanes of the impeller 5 are curved both in longitudinal and in transverse direction. The impeller 5 consists of aluminum, i.e. both its structural armoring and the vanes. 6 is the central axis where the vanes of impeller 5 unite. This axis transmits the circular motion to a central mechanical gear 15. 7 designates reinforcements located at both sides of the shovels or ribs where they touch the central axis 6. These reinforcements preferably consist of steel. The reinforced region exhibits a covering 8, which at the same time protects the upper part of the axis.

In the area where the axis 6 penetrates the domed building 3 shock plates 9 of steel are located which are connected with the concrete structure of the domed building 3. Here the bearings of the central axis are installed. 10 designates a profile which surrounds and reinforces the vanes of the impeller 5.

Above the access doors 2 to the interior of the domed building are located screens 11 of armored concrete which represent part of the whole structure of the domed building.

In the interior of the domed building 3 installations are located by means of which the kinetic energy of the impeller is converted into electrical energy via the axis.

12 designates an alternator and a connection case for the output cables of the electrical energy. 13 represents the generator and 14 designates the above-mentioned automatic revolution control. 15 designates the gear receiving the kinetic energy of the impeller axis.

Figure 9:
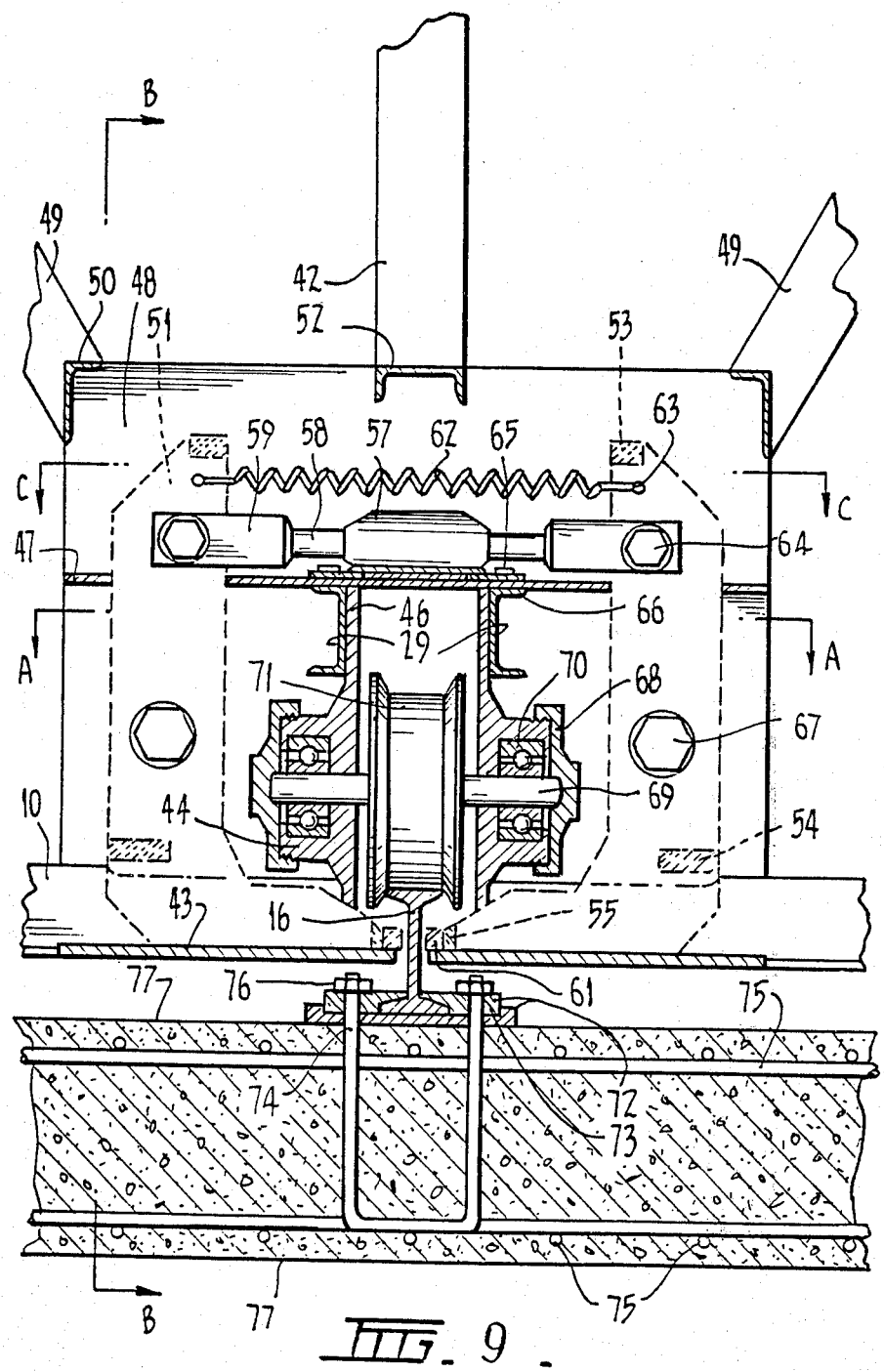
FIGS. 9-12: schematic views of an embodiment of a running, brake and holding member of the vane of the impeller.
Figure 10:
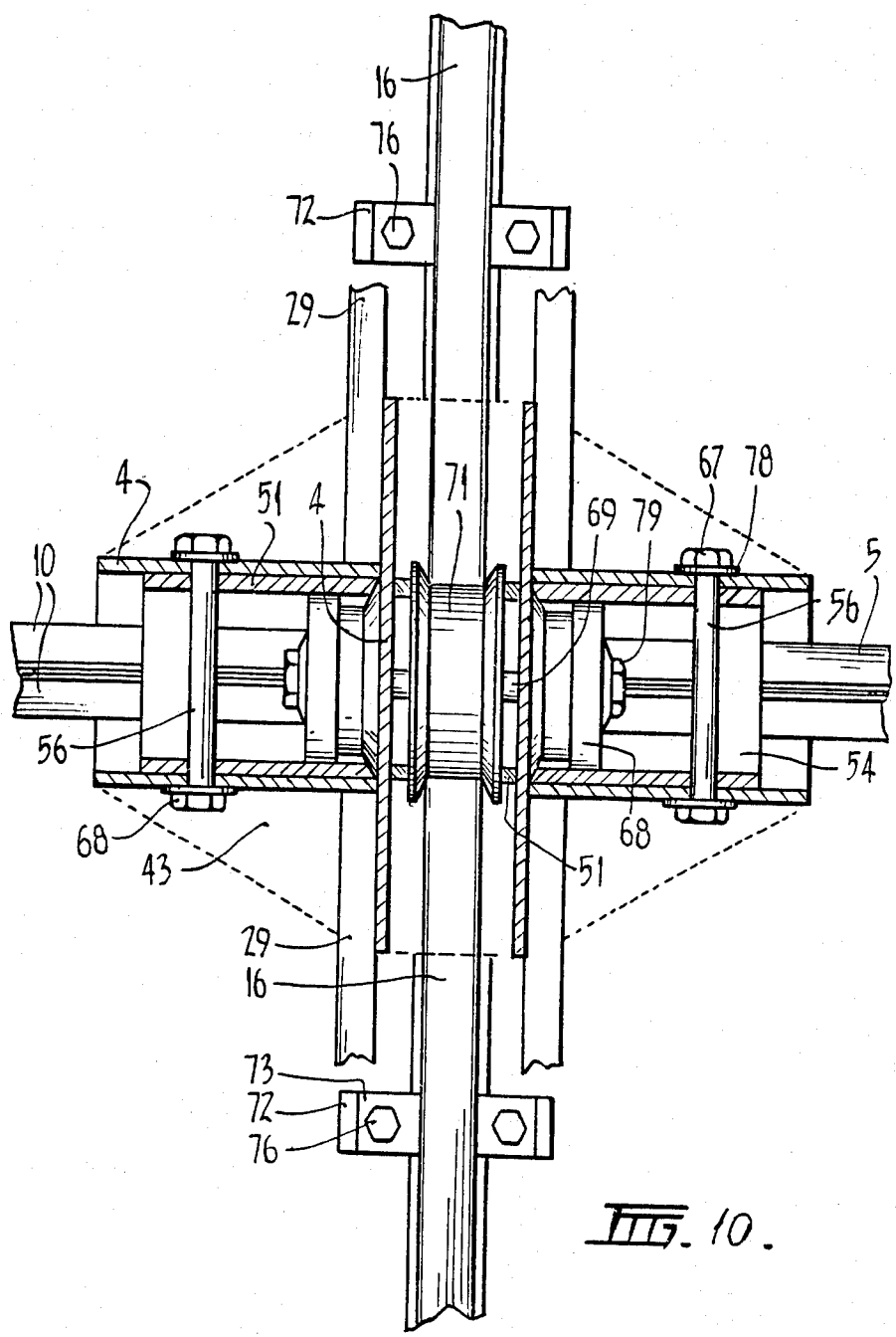
Figure 11:
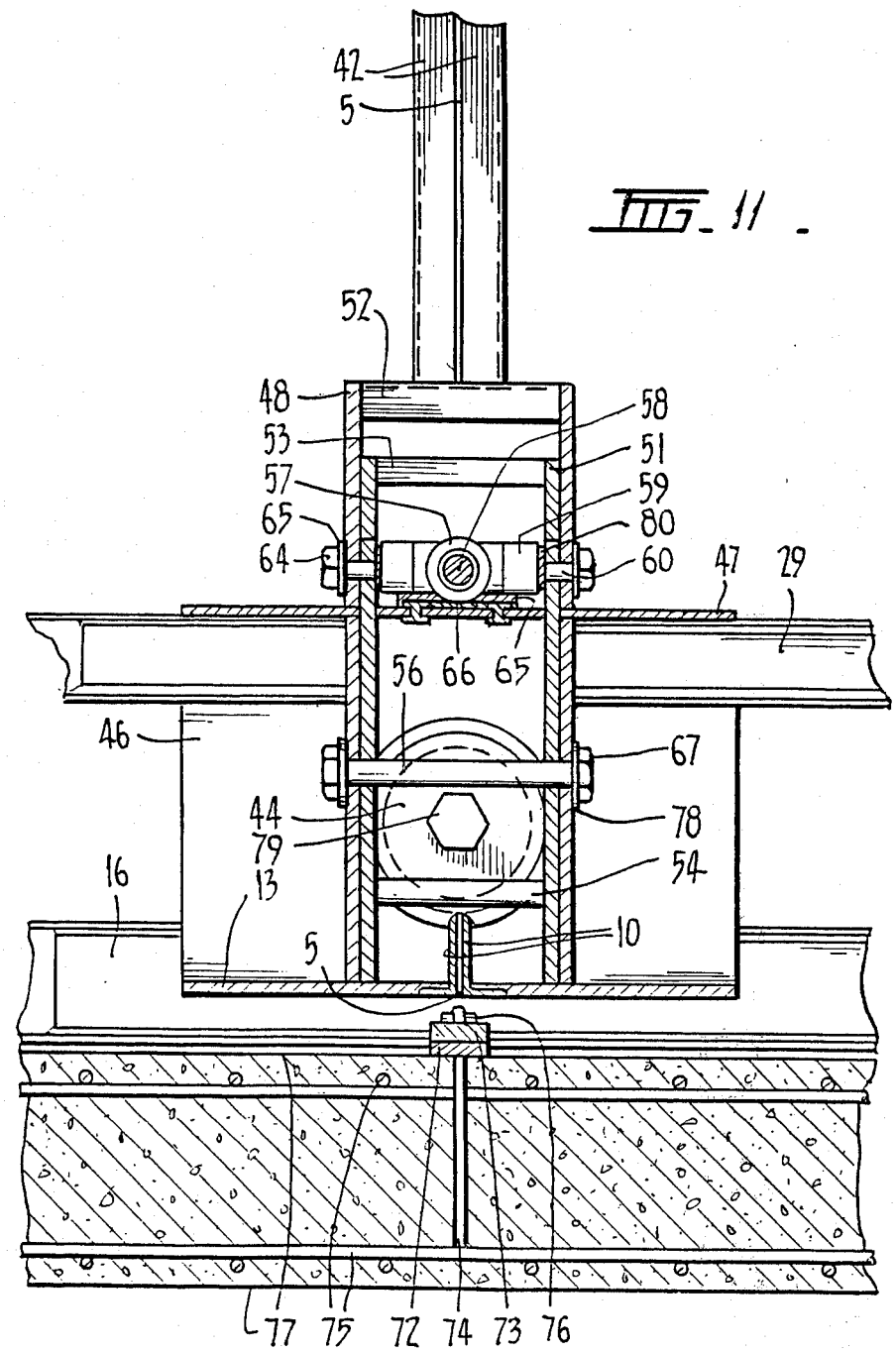
Figure 12:
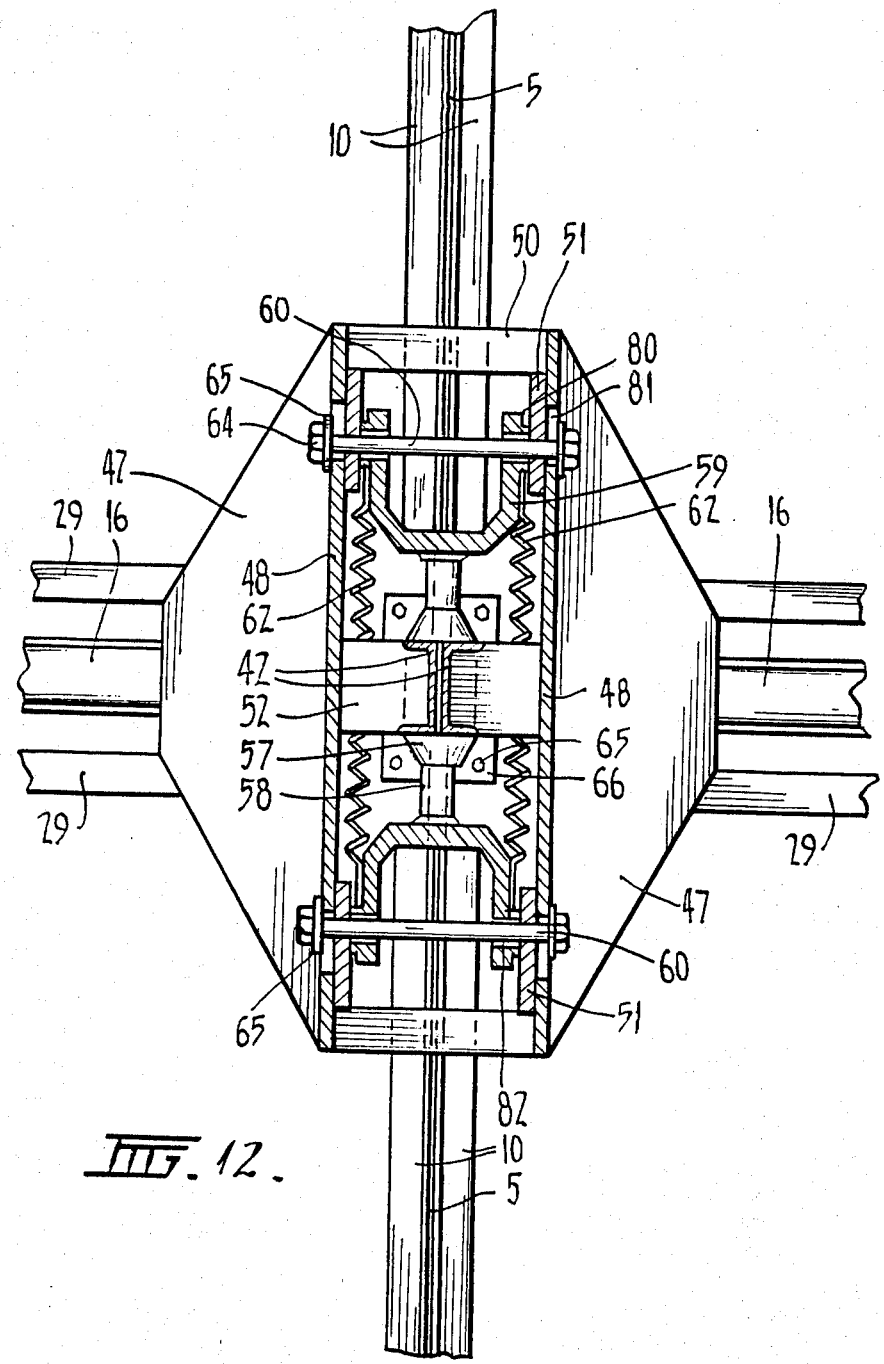

Rails 16 are anchored at the surface of the concrete structure of the domed building. The inventive running, brake and holding members for the impeller move on these rails. FIGS. 9 and 12 show in detail an embodiment of this connection between vanes and rail.

FIG. 2 shows an enlarged part of the vertical section of the system of the invention according to FIG. 1. Apart from the elements of the inventive system already known in FIG. 1, FIG. 2 particularly shows the construction of a vane of the impeller 5 in a preferred embodiment. Apart from the peripheral reinforcement profile 10, the vane exhibits at mid height a profile 45 and additional, diagonal profiles 42 and 49. 26 designates a central hydraulic installation supplying the brake members of the impeller with pressure. Installation 26 may be any one suitable for this purpose. It is located on a platform 28 carried by supports 27. Installation 26 is arranged between two of the impeller vanes and circles with them. 33 and 34 designate points of the lower edge of the vanes where the profile 10 forms angles, which adapt to the reinforced region of the domed building 3 near the axis.

The horizontal axis which connects the individual elements of the machine park has the number 41.

Figure 6:
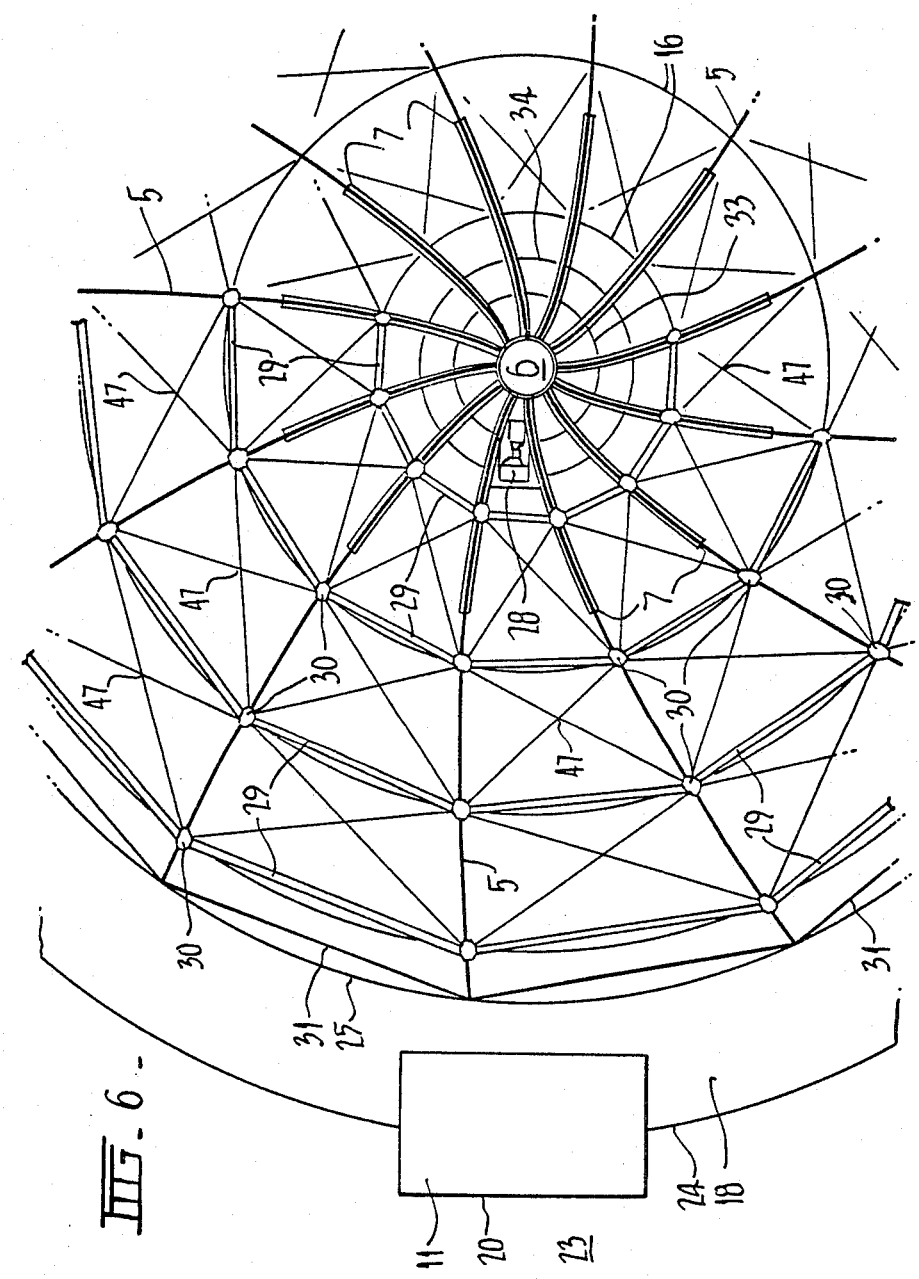
FIG. 6: a top view of the embodiment of the system according to FIG. 2 in the direction of the axis of the impeller on the sectional area I—I schematically drawn in FIG. 2.
Figure 7:
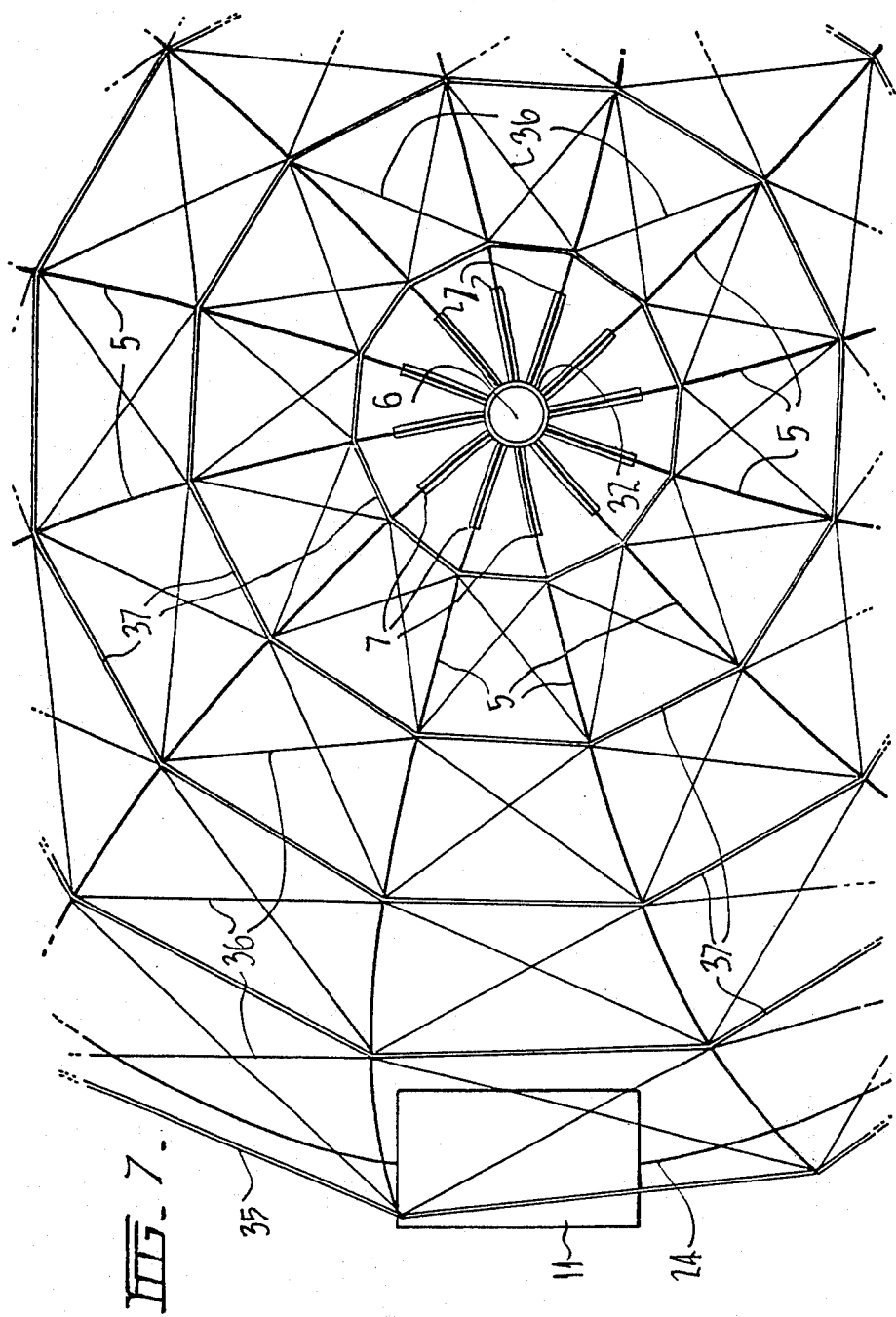
FIG. 7: a top view according to FIG. 6 on the sectional area II—II schematically drawn in FIG. 2.
Figure 8:
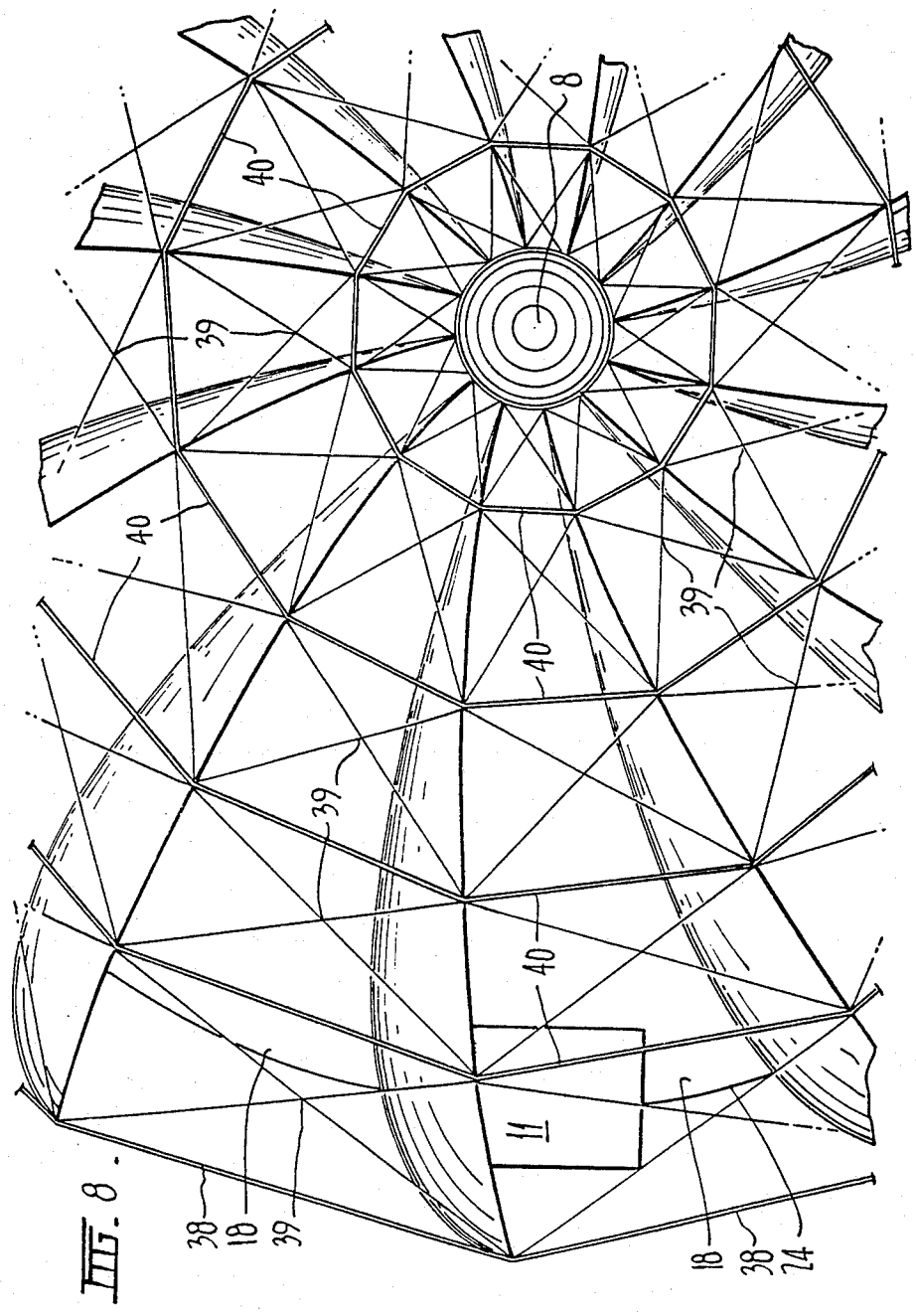
FIG. 8: a top view according to FIG. 6 on the sectional area III—III schematically drawn in FIG. 2.

The elements which serve to brace the vanes of the impeller 5 are represented in FIGS. 6 to 8.

Figure 3:
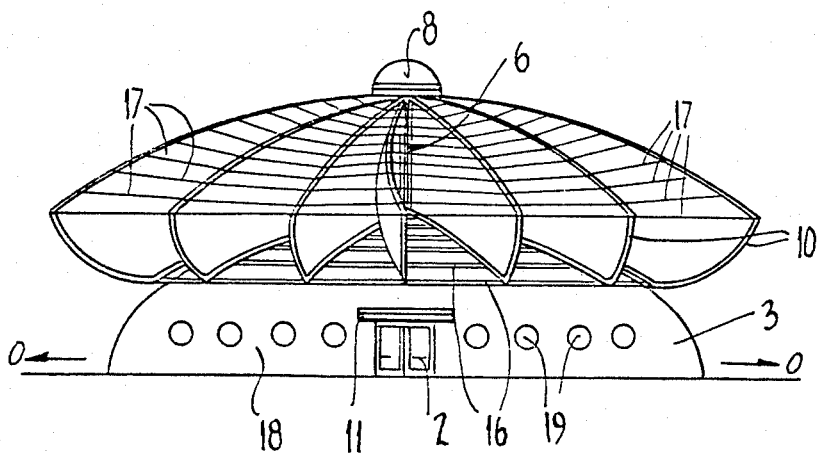
FIG. 3: a side view of the system.

FIG. 3 is a side view of the system according to the invention. This view particularly shows the outer surface 18 of the domed building 3, an access door 2 and apertures for light and ventilation 19. The construction of impeller 5 shows a simple embodiment; what can be seen are the curvature of the vanes, the rails 16 on which the vanes 5 of the domed building are supported, the peripheral reinforcements 10 of the vanes 5 and steel cables 17 for strutting the vanes. (To make the Figure as clear as possible, only cables between the upper edges of the vanes are shown).

Figure 4:
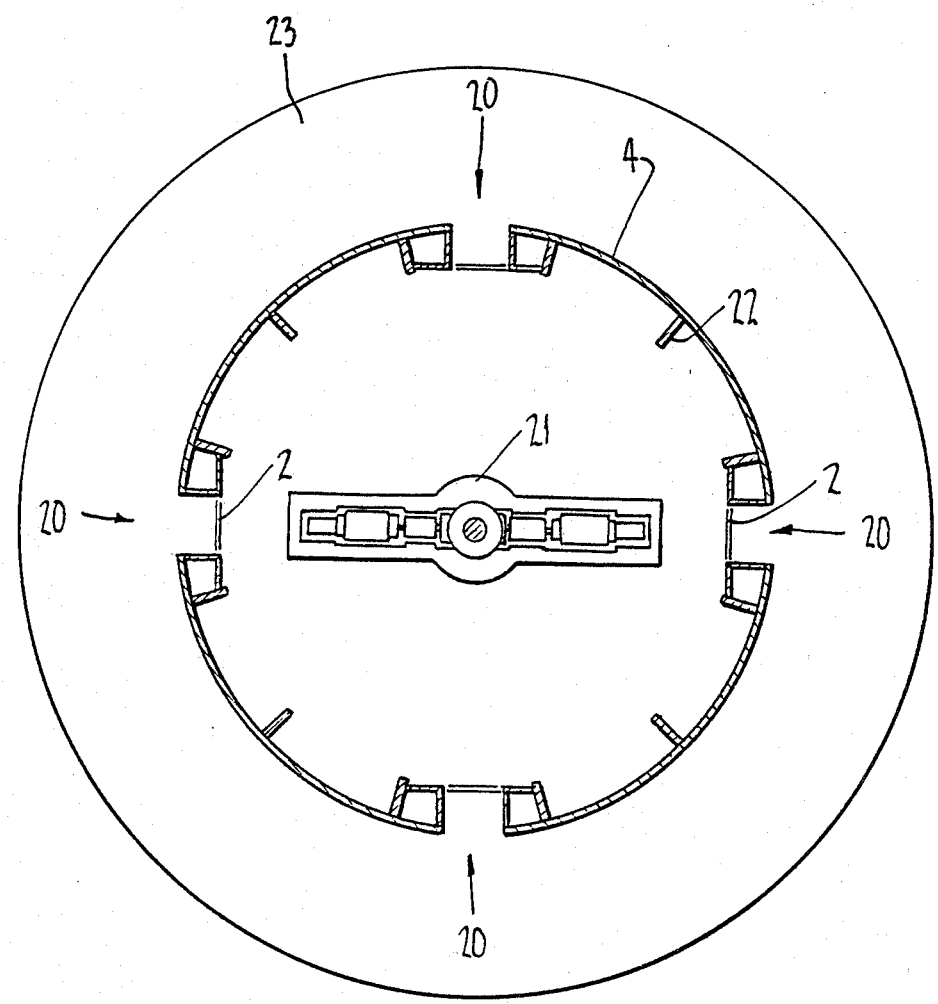
FIG. 4: a horizontal section of the system at the height of line 0—0 of FIG. 3.

FIG. 4 shows a horizontal section of the inventive system at the height of line 0—0 of FIG. 3. In FIG. 4 the number 20 designates the access to the interior of the domed building 3. 21 represents a platform which is isolated from the rest of the floor and absorbs the vibrations caused by the rotary movement of the impeller 5. The machine park is arranged on this platform comprising the gear 15, the revolution control 14, the generators 13 and the alternators 12.

A cross-section of the structure of the domed building 3 shows horizontal sections of the ribs 22, which support the dome, and the cover 4 of the dome.

23 indicates a flat area provided around the installation which is intended to facilitate the access of the wind to the system of the invention.

Figure 5:
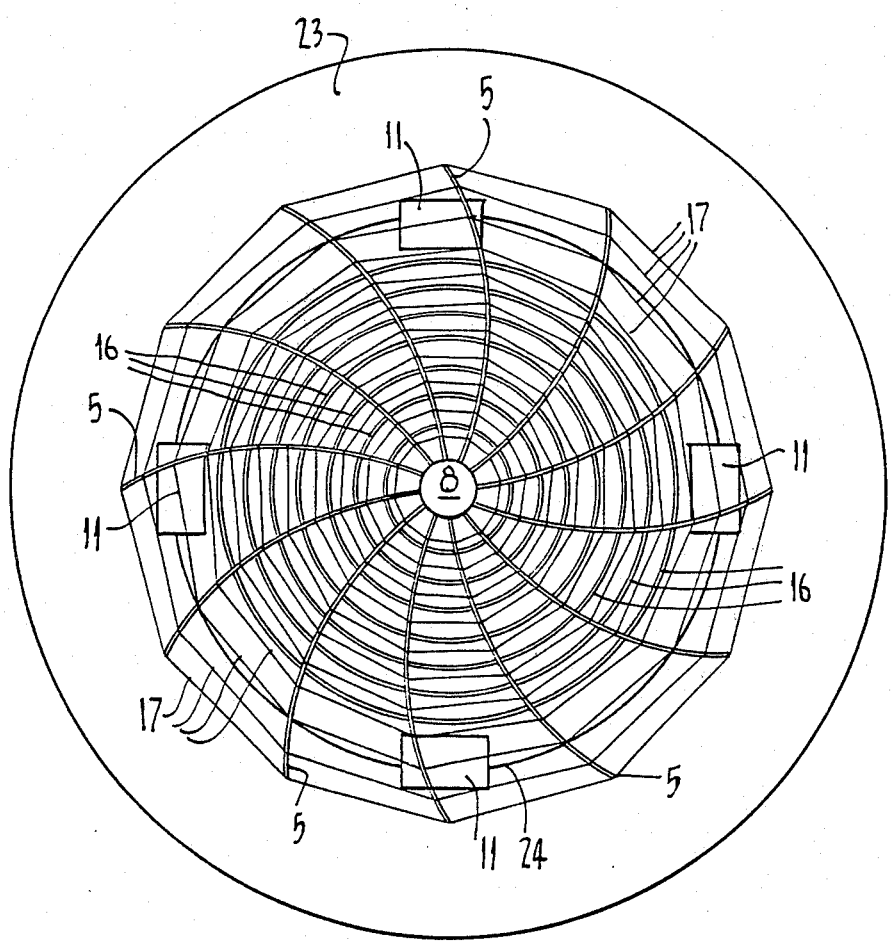
FIG. 5: a top view of the embodiment of the system according to FIGS. 1 and 3.

FIG. 5 represents a top view of the embodiment of the invention according to FIGS. 1 and 3. Rails 16 on which the vanes of the impeller 5 are supported and roll can be seen. 24 designates the circumference of the dome at its base and 17 the steel cables bracing the impeller vanes in the above-represented simple embodiment of the invention.

FIG. 6 shows a top view of the inventive system in the direction of the impeller axis on the sectional area I—I schematically shown in FIG. 2, i.e. on a surface above the lower edge of the vanes of the impeller 5.

FIG. 6 shows a cross-section of the vanes of the impeller 5 and the reinforcements 7 on both their sides in the region near the axis. According to FIG. 6 four concentrically arranged circular rails 16 are located on the surface 4 of the domed building 3. In FIG. 6 the points where the lower edges of the vanes cross the rails 16 are designated by numbers 30. At these points the running, brake and holding members of the vanes of the impeller 5 are located which will be illustrated below by means of FIGS. 9 to 12.

Each vane is connected and braced with the adjacent vanes at its lower edge at points 30 by means of rigid profiles 29 having a U-shaped cross-section. Further, between the points 30 steel cables are arranged at the same height in such a way that they extend from one point 30 of a vane to another point 30 of the adjacent vane situated at a greater or a smaller distance. At the outer circumference of the vanes a further rigid profile 31 is located which preferably consists of steel and is shaped as a double T. The circle 25 represents the line which describes the outer end of the lower edge of the impeller vanes when rotating.

By means of the profiles 29 and 31 and the cables 17 consisting preferably of steel an excellent connection and bracking of the lower edges of the vanes of the impeller 5 is achieved. Numbers 33 and 34 of FIG. 6 designate the circles which form the corresponding points of FIG. 2 when rotating. 32 designates a peripheral reinforcement in the region where the vane of the impeller 5 is connected with the axis 6.

FIG. 7 is a similar top view of the system of the invention as that shown by FIG. 6, however at the height of the sectional area II—II schematically shown in FIG. 2, i.e. on a surface located somewhat above half the height of the vanes of the impeller 5.

A half height the vanes of the impeller 5 are connected and braced with each other by means of profiles 35 and 37, which are preferably of steel and have the shape of a double T. For further bracing additional cables 36, preferably steel, are situated at the same height which similarly connect adjacent vanes, as has been illustrated in connection with the lower edge of the vanes.

FIG. 8 shows a further top view of the system according to the invention, however at the height of the sectional area III—III schematically shown in FIG. 2, i.e. on a surface above the upper edge of the vanes of the impeller 5.

From FIG. 8 the curved form of the vanes of impeller 5 can be taken. Similarly to their lower edge and at medium height the vanes of the impeller 5 are connected and braced at their upper edge by profiles 38 and 40, preferably of steel in the form of a double T. The cables 39 serve in the same way as at the lower edge and mid height for further bracing of the vanes at their upper edges.

FIGS. 9 to 12 represent an embodiment of the inventive running, brake and holding members of the vanes of the impeller 5. These installations include the circular rails which are concentrically mounted to the surface of the domed building 3, the rotors of the vanes including their mountings, and the brake and holding members. FIGS. 9 to 12 show various sections of an embodiment of these members.

The steel rail 16 with the double T profile are anchored at the surface 4 of the domed building 3 by means of steel plates 72 and 73 and U-shaped installations 74 embedded in the armed concrete, and secured with screws 76. In FIG. 9 the steel armoring of the domed building has the number 75, while the lines characterizing its thickness are designated by 77.

The lower base of the running, brake and holding member is formed by two steel plates 43 which are mounted perpendicular to the surface of the vane at its lower edge by means of the reinforcement profile 10. Both plates 43 exhibit trapezoid surfaces and are arranged to each other with the longer of their parallel sides in such a way that between them a gap is formed in which the perpendicular part of the rail 16 is located. The gap is narrower than the upper horizontal beam of the double T profile of the rail 16. Above the plates 43 and in the surface of the vane a sparing is provided which can be recognized schematically from FIG. 2. In this sparing the running, brake and holding members are located. The plates 43 prevent the vanes from lifting off when the blasts of wind are strong since the gap between them does not allow lifting above the upper T of the rail 16.

Plates 48 are provided perpendicular to the plates 43 as front and rear cover of the running, brake and holding members which are connected by means of profiles 52 and 50 with the plates 43 on the one hand and the vane 5 on the other hand via the reinforcement profiles 42 and 49 thereof. The perpendicular plates 48 have an approximately quadratic surface exhibiting a sparing in the area of the rail 16.

At about ⅔ height of the plates 48 and perpendicular thereto and parallel to the plates 43 and upper cover 47 is arranged and fixedly connected with the plates 48. Between this upper cover plate 47 and the plates 43 is located the mounting of the rotor 71. This mounting consists of two profiled pieces 44 of cast steel, which take up the bearings 70 of the rotor 71 by the aid of which the vane of the impeller 5 runs on the rails 16 and is supported. For the sake of clarity in FIG. 9 the axis is drawn above the bearings and the rotor. The bearings 70 of the axis 69 which are located within the cast profiles 44 are laterally bordered by the covers 68 and 79.

The steel cast profiles 44 are elongated in upward direction to the upper cover plate 47 in the form of the profiles 46. At their outer sides—connected with these and the upper cover plates 47—are installed U-shaped profiles 29, preferably of steel. These extend over the region of the running, brake and holding member and connect the vane rigidly with the lower edges of the adjacent vanes; see FIG. 6.

On the inner side of each plate 48 are arranged two brake blocks 51. They are rotatably arranged around axes 56, which are bolted with discs 78 and screws 67 outside the plates 48 which hold them together. Spacers 53, 54 and 55 separate the brake blocks 51 from the corresponding brake blocks mounted to the other plate 48.

The two brake blocks mounted on a plate 48 have in combination the form of a large U, which is interrupted in the middle of the horizontal beam. Here the perpendicular part of the rail 16 is located. Brake linings 61 are arranged at both closely opposing ends of the brake blocks 61 located at both sides of the rails 16. This part of the brake blocks 51 is situated directly above the plates 43.

At the upper end the brake blocks 51 are stretched towards each other by springs 62 connected with them by means of screws 63. This is the rest position of the brake blocks 51 where the brake lining 61 are not pressed against the sides of the rails 16.

At the upper side of the upper cover plate 47, on a plate 66 connected with the plate 47 by means of screws 65, a hydraulic cylinder 57 is arranged having two pistons 58 which are able to exercise pressure on the U-shaped profiles 59. The legs of the U-shaped profiles 59 are connected with the brake blocks 51 at their inner side by means of axes 60. The axes 60 also penetrate the plates 48 and are mounted at their outer sides by means of discs 65 and screws 64.

The hydraulic cylinder 57 is connected with the central hydraulic installation 26. If pressure is exercised on the U-shaped profiles 59 via the cylinder 57 and the pistons 58 said profiles move apart. As the brake blocks 51 are tightly connected with the profiles 59, they too are moved apart in their upper part by simultaneously stretching the spring 62. The brake blocks 51 rotate around the axis 56 and thus their lower ends move towards each other, the brake linings 61 being pressed against the sides of the rails 16. In order to enable the brake blocks 51 to move apart in their upper part, sparings 81 are provided in the plates 48. The rotary movement of the axes 60 is enabled by bearings 82 in the U-shaped profiles 59. Shims 80 are arranged between the profiles 59 and the brake blocks 51.

The example illustrates the invention.

Example

A system suitable for practical use in the generation of electrical energy from wind energy has the form shown in the Figures. The domed building has its base an outer diameter of 100 m and an inner diameter of 84 m. Its maximum height is 27 m. The shape of the impeller vanes is adapted to the curvature of the domed building. The largest impeller diameter is 120 m. The vanes are 20 m tall.

On the surface of the domed building are located seven concentrically arranged circular rail lengths, the distance of the innermost to the center of the domed building being 15 m. The distance between the individual rail lengths is 5 m.

The impeller runs on rails by means of rollers with rubber running surface. The impeller consists of 12 vanes which altogether exhibit 84 rollers.

By means of the described arrangement the friction is relatively low when the impeller rotates. Owing to its large dimensions and the resulting considerable mass, the impeller possesses sufficient inertia to maintain a constant rotary movement when the wind force and speed change briefly.

I claim:
1. A system for generating electrical energy from wind energy, comprising a domed building upon which an impeller is mounted whose vertical axis penetrates the domed building at its highest point and transmits the motion of the impeller to an installation which converts the kinetic energy of the impeller into electrical energy, said impeller having vanes extending in the radial direction wherein at least the lower edge of the vanes of the impeller is curved in the radial direction to conform to the curved shape of the domed building and the vanes are supported on rails located beneath the lower edges of the vanes and held by them, said rails being spaced apart in the radial direction and anchored to the assembly of the domed building in such a way that they describe concentric circles around its highest point.

2. A system according to claim 1 wherein the vanes of the impeller are curved both in longitudinal and in transverse direction.

3. A system according to claim 1 wherein the vanes of the impeller are reinforced by profiles and connected and braced by cables.

4. A system according to claim 3 wherein the cables are located at constant height between the upper edges, the middle region and the lower edges of the vanes as well as between the upper edge of one vane and the middle region of the adjacent vanes and between the middle region of a vane and the lower edge of the adjacent vanes, and vice versa.

5. A system according to claim 1 wherein the vanes of the impeller move on the rails via rollers.

6. A system according to claim 5 wherein the rollers represent part of a running, brake and holding member for the impeller vanes.

7. A system according to claim 5 or 6 wherein the outer surface of the rollers which is in contact with the rails is rubber.

8. A system for generating electrical energy from wind energy, comprising a domed building upon which an impeller is mounted whose vertical axis penetrates the domed building at its highest point and transmits the motion of the impeller to an installation which converts the kinetic energy of the impeller into electrical energy, said impeller having vanes extending in the radial direction wherein at least the lower edge of the vanes of the impeller is curved in the radial direction to conform to the curved shape of the domed building and the vanes are supported on rails located beneath the lower edges of the vanes and held by them, said rails being spaced apart in the radial direction and anchored to the assembly of the domed building in such a way that they describe concentric circles around its highest point with said rails having a T-shaped configuration in at least their upper region; wherein said vanes are supported and held by said rails with running, braking and holding members each of which include:

two first plates mounted to the vane perpendicular to the lower edge thereof via a profile in such a way that a gap is formed between said first plates in which runs the rail, the gap being narrower than the upper T of the rail;

two second plates arranged parallel to the surface of the vane and mounted respectively to its front and rear side via profiles;

an upper cover which is tightly connected with the second plates;

roller means located between the first and second plates and the cover for moving the vanes of the impeller on the rails; and a pair of brake blocks each, rotatably mounted on the side of the second plates facing the vane, brake linings being located above the first plates on both sides of the perpendicular part of the T-shaped rail and hydraulic means for selectively pressing said brake linings against said rails.

* * * * *